United States Patent Office 2,818,370
Patented Dec. 31, 1957

2,818,370 p-AMINOARSENOSOBENZENE COMPOSITIONS

Richard U. Schock, Waukegan Township, Lake County, and Douglas V. Frost, Waukegan, Ill., assignors to Abbott Laboratories, North Chicago, Ill., a corporation of Illinois No Drawing. Application October 7, 1953
Serial No. 384,786

4 Claims. (Cl. 167—53.1)

This invention relates generally to a therapeutic product for the treatment of animals and more particularly to an improved organic arsenic composition for controlling the physiological development of poultry and certain avian diseases, such as coccidiosis.

It is an object of the present invention to provide an improved composition for aiding the physiological development of domestic animals.

It is a further object of the present invention to provide an improved composition controlling disease in poultry.

It is also an object of the invention to provide an improved organic arsenic compound-containing poultry feed for the treatment of coccidiosis.

Other objects of the invention will be apparent from the detailed descriptions and claims to follow.

The present invention comprises an animal feed containing a small amount of an aminoarsenosobenzene, often referred to as arsenosoaniline. The compound of the above class found to be particularly active in a poultry feed for the treatment of poultry diseases, such as coccidiosis, is the compound p-aminoarsenosobenzene having the following structural formula:

The compound p-aminoarsenosobenzene, which can also be designated as 4-aminophenylarseneoxide, is prepared by dissolving p-arsanilic acid in dilute sulfuric acid to which a slight amount of potassium iodide is added and thereafter treating the solution with sulfur dioxide at 20° C. for six hours. The solution is then chilled to about 5–10° C. and is gradually made alkaline with concentrated ammonia with vigorous stirring. The crude product which slowly precipitates is purified by dissolving in dilute caustic soda, extracting with ether, and salting out the purified p-aminoarsenosobenzene by the addition of ammonium chloride solution to the aqueous layer. The compound p-aminoarsenosobenzene or 4-aminophenyl-arseneoxide can also be prepared by acidifying with hydrochloric acid a concentrated aqueous solution of atoxyl. The precipitated sodium chloride is removed by filtration and the filtrate saturated with sulfur dioxide. After twelve hours the hydrochloride of 4-aminophenylarseneoxide begins to crystallize from the solution. The solution is then saturated with hydrochloric acid. The said hydrochloride of 4-aminophenylarseneoxide is introduced into cold water rendered alkaline with concentrated aqueous caustic soda and the free arseneoxide compound salted out by saturating the solution with sodium chloride.

Other methods known to those skilled in the art can be used to prepare the said compound.

The compound p-aminoarsenosobenzene, also designated as 4-aminophenylarseneoxide, crystallizes with two molecules of water to form well-defined, lustrous needles softening at 80° C. and melting at 100° C. with foaming. The anhydrous compound softens at 90° C., partially melts at 100° C. and upon further heating first resolidifies and then melts at 185–186° C. It exhibits weak acidic properties but has pronounced basic properties, dissolving in both dilute mineral acids and in aqueous acetic acid. It is readily soluble in hot water, cold methyl alcohol, ethyl alcohol, glacial acetic acid, acetone or pyridine, but sparingly soluble in cold water, ether, and ethyl acetate and is insoluble in chloroform and benzene.

The compound arsenosoaniline with which the present invention is concerned is most conveniently administered to poultry by admixing with the feed or other inert diluent consumed by the poultry. The effective concentration as applied to poultry, such as chickens and turkeys, varies within certain overlapping ranges depending upon the particular problem for which the composition is administered. In each instance, however, the therapeutic dosage is well below the toxic limits. For example, coccidiosis in chickens is effectively controlled when the composition arsenosoaniline is administered in concentrations of at least about 0.002% and preferably between about 0.002% and 0.01% based on the weight of the arsenosoaniline in the poultry feed mix. While larger concentrations can be used, there appears to be no therapeutic advantage.

The arsenosoaniline compound was used in anti-coccidial tests on seven-day old Barred Rock male chicks in which the chicks were subjected to the standard prophylaxis test for Eimeria tenella. Medication comprising the said arsenosoaniline was administered to the chicks by admixing the drug with a standard chick ration twenty-four hours prior to infecting the chicks with 500,000 of the said infecting organisms (Eimeria tenella). The said medication was continued throughout the duration of the test and the survivors at the end of the eighth day were recorded. The following results were obtained:

Table A

| Percent p-Aminoarsenosoaniline in Feed | Survivors in 8 Days | |
|---|---|---|
| | Survivors/Total | Percent of Survivors |
| Control | 10/25 | 40 |
| 0.0085 | 18/20 | 90 |
| 0.0064 | 17/19 | 89.5 |
| 0.0021 | 13/19 | 68.4 |

From the foregoing description and data, it is evident that the feed composition herein disclosed has pronounced utility when used for treating poultry and is particularly useful for controlling coccidiosis when used in concentrations between about 0.002% and 0.01% of the feed mixture.

Others may readily adapt the invention for use under various conditions of service, by employing one or more of the novel features disclosed or equivalents thereof. As at present advised with respect to the apparent scope of our invention, we desire to claim the following subject matter.

We claim:

1. An animal feed composition comprising a solid animal nutritional vehicle adapted for oral ingestion having dispersed therethrough a small amount of p-aminoarsenosobenzene.

2. An animal feed composition comprising a solid animal nutritional vehicle adapted for oral ingestion having dispersed therethrough a small amount of p-aminoarsenosobenzene in a concentration of at least about 0.002% based on the weight of the said vehicle.

3. An animal feed composition comprising a solid animal nutritional vehicle adapted for oral ingestion having dispersed therethrough a small amount of p-aminoarsenosobenzene in a concentration between about 0.002% and 0.01% based on the weight of the said vehicle.

4. A poultry feed composition for the treatment of coccidiosis which comprises a vehicle adapted for oral ingestion by poultry having a small amount of a p-aminoarsenosobenzene dispersed therethrough, said p-aminoarsenosobenzene being present in an amount between about 0.002% and 0.01% based on the weight of the said vehicle.

References Cited in the file of this patent

Seiden: Manufacturing Chemist, April 1950, vol. 21, Nov. 4, pp. 155 and 157.

Eagle et al.: Pharmacological Reviews, vol. 3, 1951, pp. 107, 108, 109 and 111–113.